(12) United States Patent
Gomez et al.

(10) Patent No.: US 10,027,718 B2
(45) Date of Patent: Jul. 17, 2018

(54) AUTOMATED SECURITY DESIGN FOR INTERNET OF THINGS SYSTEMS

(71) Applicant: SAP SE, Walldorf (DE)

(72) Inventors: Laurent Gomez, Pegomas (FR); Jose Marquez, Heidelberg (DE); Cedric Hebert, Haut-Sartoux (FR)

(73) Assignee: SAP SE, Walldorf (DE)

( * ) Notice: Subject to any disclaimer, the term of this patent is extended or adjusted under 35 U.S.C. 154(b) by 151 days.

(21) Appl. No.: 15/231,488

(22) Filed: Aug. 8, 2016

(65) Prior Publication Data
US 2018/0041546 A1    Feb. 8, 2018

(51) Int. Cl.
*H04L 29/06* (2006.01)

(52) U.S. Cl.
CPC .................... *H04L 63/205* (2013.01)

(58) Field of Classification Search
None
See application file for complete search history.

(56) References Cited

U.S. PATENT DOCUMENTS

| | | | | |
|---|---|---|---|---|
| 2015/0262443 | A1* | 9/2015 | Chong | G07C 9/00896 340/5.71 |
| 2016/0072839 | A1* | 3/2016 | Mortimore, Jr. | H04L 63/20 726/1 |
| 2016/0357524 | A1* | 12/2016 | Maluf | G06F 8/34 |
| 2016/0366141 | A1* | 12/2016 | Smith | H04L 63/062 |
| 2017/0171607 | A1* | 6/2017 | Britt | H04N 21/43615 |

OTHER PUBLICATIONS

Harvard Business Review, https://hbr.org/2013/06/cyber-security-in-the-internet/Jun. 21, 2013.
Cybersecurity and the Internet of Things, Ernst & Young, http://www.ey.com/Publication/vwLUAssets/EY-cybersecurity-and-the-internet-of-things/$FILE/EY-cybersecurity-and-the-internet-of-things.pdf Mar. 2015.
Orange book, http://csrc.nist.gov/publications/history/dod85.pdf Department of Defense Standard, Dec. 1985.
Rainbow series, http://fas.org/irp/nsa/rainbow.htm Created by John Pike, Website maintained / updated Feb. 6, 2006.
Information Technology Security Evaluation Criteria (ITSEC), https://www.bsi.bund.de/cae/servlet/contentblob/471346/publicationFile/30220/itsec-en_pdf.pdf Jun. 1991.
Common Criteria, http://www.commoncriteriaportal.org/. retrieved and printed on Jun. 9, 2016.

(Continued)

*Primary Examiner* — William J. Goodchild
(74) *Attorney, Agent, or Firm* — Fountainhead Law Group P.C.

(57) ABSTRACT

Embodiments are configured for automating security design in IoT systems. The achievable security level for any given IoT system may be assessed based on the capabilities of each of the entities involved in its data path to generate a set of security policies for the IoT system. The capabilities of each entity involved in the IoT data path can be evaluated together with the capabilities of the communication links between entities. Based on these capabilities and user security preferences, the security policies can be generated to achieve a target level security. Based on this approach, security designs of IoT architectures can be developed through automated information collection.

20 Claims, 9 Drawing Sheets

(56) References Cited

OTHER PUBLICATIONS

Security by design, https://en.wikipedia.org/wiki/Security_by_design Modified Dec. 23, 2015.
Enforcing Security in Smart Homes using Security Patterns, Paul El Khoury, Pierre Busnel, Sylvain Giroux, and Keqin Li, http://www.sersc.org/journals/IJSH/vol3_no2_2009/5.pdf International Journal of Smart Home, vol. 3, No. 2, Apr. 2009.
Risk assessment, https://en.wikipedia.org/wiki/Risk_assessment Modified on Jun. 5, 2016.

* cited by examiner

AUTOMATED SECURITY DESIGN FOR INTERNET OF THINGS SYSTEMS

BACKGROUND

Over the next decade, the Internet of Things ("IoT") will have a huge impact across industries for delivery of critical services. By the year 2020 it has been forecasted that there will be over 50 billion connected devices. IoT objects have the ability to transfer data and interact with their physical environment without requiring any human interaction. Paradoxically, however, the very principle that makes IoT so powerful can also create a huge security threat. The impact of the IoT on cybersecurity is expected to be profound and is expected to challenge the ability to deliver adequate security in IoT-enabled devices, networks, commercial operations, partner ecosystems, etc.

Cybersecurity is a business-wide issue—not just a technology risk. With the up-coming mass deployment of connected IoT devices, the boundaries between an organization and the outside world will be effectively removed. IoT devices and connections between devices will therefore become targets for cyberattacks, data eavesdropping, fake measurement injection, and/or incorrect commands, etc. In that context, user safety and privacy is at risk. Lack of security is an important obstacle to the adoption of IoT.

But securing IoT solutions raises several technical challenges because, among other things, the general trend for IoT solutions is toward deploying less expensive devices with less processing capabilities (e.g. CPU, RAM, battery, communication protocols, etc.). Device processing capabilities have a direct impact on the security capabilities that implement security solutions such as encryption, secure data storage, and/or digital signatures, etc.

SUMMARY

The embodiments described in this disclosure relate to improved methods, systems and computer readable media for automated security design in IOT systems.

The following detailed description and accompanying drawings provide a better understanding of the nature and advantages of the techniques described in this disclosure.

BRIEF DESCRIPTION OF THE DRAWINGS

For a better understanding of at least certain embodiments, reference will be made to the following detailed description, which is to be read in conjunction with the accompanying drawings.

DETAILED DESCRIPTION

Figure 1:
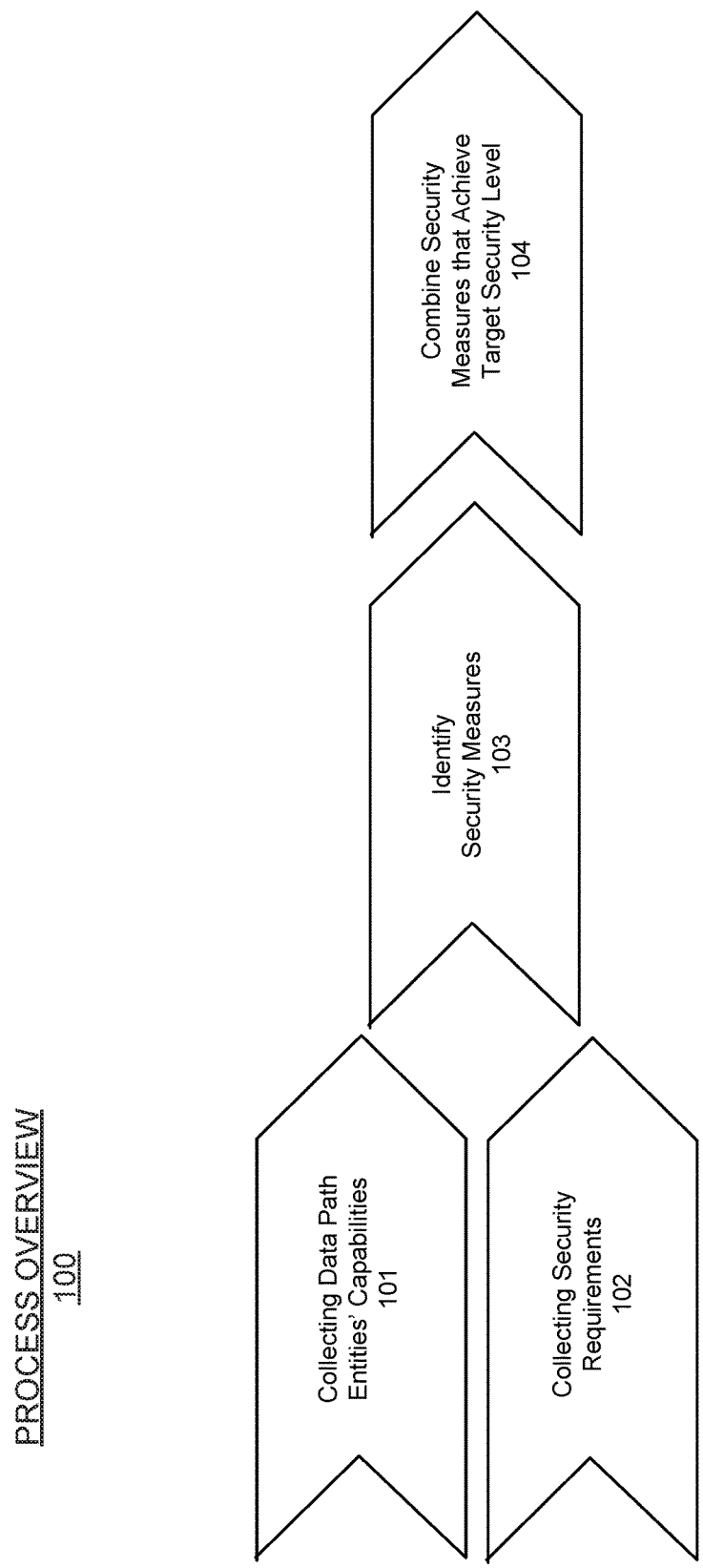
FIG. 1 depicts a diagram of an example embodiment of an overall process for security level assessment in IoT systems in accordance with the techniques described in this disclosure.

Throughout the description, for the purposes of explanation, numerous details are set forth in order to provide a thorough understanding of this disclosure. It will be apparent to one skilled in the art, however, that the techniques described in this disclosure may be practiced without some of these specific details. In other instances, well-known structures and devices may be shown in block diagram form to avoid obscuring the principles and techniques described in this disclosure.

The embodiments described in this disclosure include improved methods, systems and computer readable media for automating security design in IoT systems. In one embodiment, the goal may be to estimate the achievable security level for any given IoT system based on the capabilities of each of the entities involved in its data path. At least certain embodiments may be configured to assist users with generating automated security policy blueprints for IoT systems. The security policies may be based upon: (i) user security preferences (e.g., desired level of security, overall costs, and compliance with regulations) and (ii) security capabilities of the entities involved in sensor data delivery from sensor nodes in the data paths of IoT systems to one or more monitoring applications operable to process the sensor data. The embodiments can also be used for simulation of security scenarios in IoT systems in order to evaluate the feasibility and efficiency of the security policies.

In one embodiment, a security framework for automated security policy blueprints for IoT solutions is disclosed. The capabilities of each entity involved in the data path may be evaluated together with the relationship between those entities (e.g., the connectivity between entities). Based on the capabilities of the entities in the data path, a set of security policies can be generated for the entities to achieve the desired level security (together with other decision factors such as feasibility and/or expenditure). Based on this approach, security designs of target IoT architectures can be developed through automated information collection of device capabilities as well as the connectivity between devices. Preferences can also be defined by users for this process. The user preferences may include allocated effort, target security level to be achieved, and maximum-security attention on a given section of an IoT system data path, etc. Embodiments can then provide one or more security assessments and propose security designs for the IoT system.

I. Illustrative Systems

Provided below is a description of an example system upon which the embodiments described in this disclosure may be implemented. Although certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner.

In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks.

FIG. 1 depicts a diagram of an example embodiment of an overall process for security level assessment in IoT systems in accordance with the techniques described in this disclosure. In one embodiment, the identification of security measures is automated. Security measures of entities in an IoT system can be identified and a match between the capabilities of IoT entities (devices and/or connectivity) and security requirements can be performed. One or more combinations of individual security measures can then be proposed based on user preferences such as achievable security level and cost. At a final step, the security level achieved by the possible combinations of security measures can be compared as well as the associated cost of implementing those security measures.

In the illustrated embodiment, process 100 includes collecting capabilities for entities in a data path (operation 101) and collecting security requirements (operation 102), e.g., user security preferences for the IoT system. The security measures for the entities in the data path can then be collected (operation 103) and the security measures that achieve a target security level (e.g., user-specified) can be combined (operation 104). In one embodiment, a "security measure" may refer to a technical description combined with an associated effort. The technical description may provide the technical details on the security solution for an IoT system together with the security goals achieved by the solution. For example, confidentiality may be achieved by encrypting the sensor data. The associated effort may be based on the expenditure or feasibility of a particular security measure implementation. For example, deployment of a public key infrastructure has a cost associated with it.

Each security measure can be associated with a security level, which, in one embodiment, can represent the likelihood of delivering specific security properties in an IoT system. The security level may be dependent on given parameters for the security measures (e.g., encryption key length). An achieved security level ("ASL") can be assigned to each entity in an IoT data path or to a communication link between two entities in the data path. In one embodiment, ASL can be determined as a combination of security level achieved with by each individual security measure either on an entity or communication link in the data path of an IoT system. When combining security measures, the respective security level on each entity can be combined to represent the overall ASL for a given data path.

Figure 9:
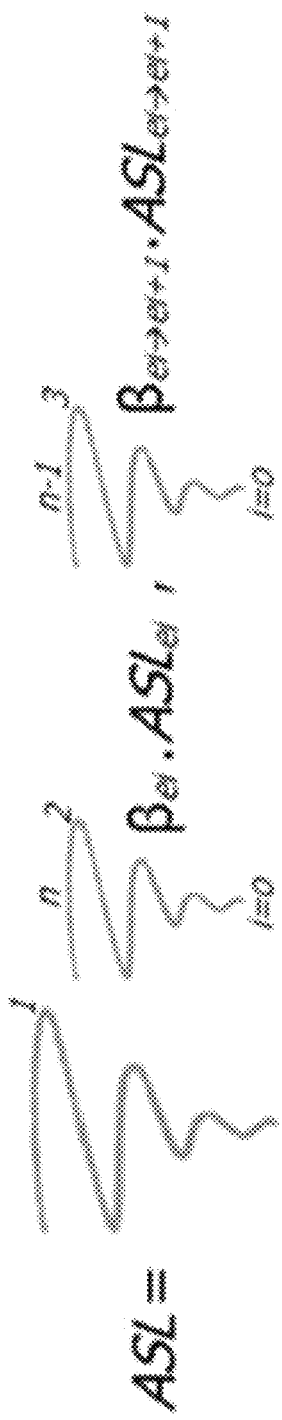
FIG. 9 presents a formula for calculating a combination of security levels.

In at least certain embodiments, an ASL combination can be implemented as an average or weighted average over the security measures applied to each entity and communication link in an IoT data path. In one embodiment, the combination of security levels can be defined by summing the security levels at each entity and communication link in the data path, as well as by multiplying the ASLs for each entity or communication link with a weighting factor depending on its contribution to the overall ASL. In one embodiment, the combination of security levels can be calculated according to the formula of FIG. 9:

where $\beta_{ei}$ and $\beta_{ei \to ei+1}$ are respective weighting factors for the entity $e_i$ and communication link ei >ei+1 in the data path. $ASL_{ei}$ can therefore be the achieved security level by $e_{ij}$ and $ASL_{ei \to ei+1}$. The combination operators may be generic and can be implemented as weighted averages or any as combination that might fit the computation of the ASL combination.

Figure 2:
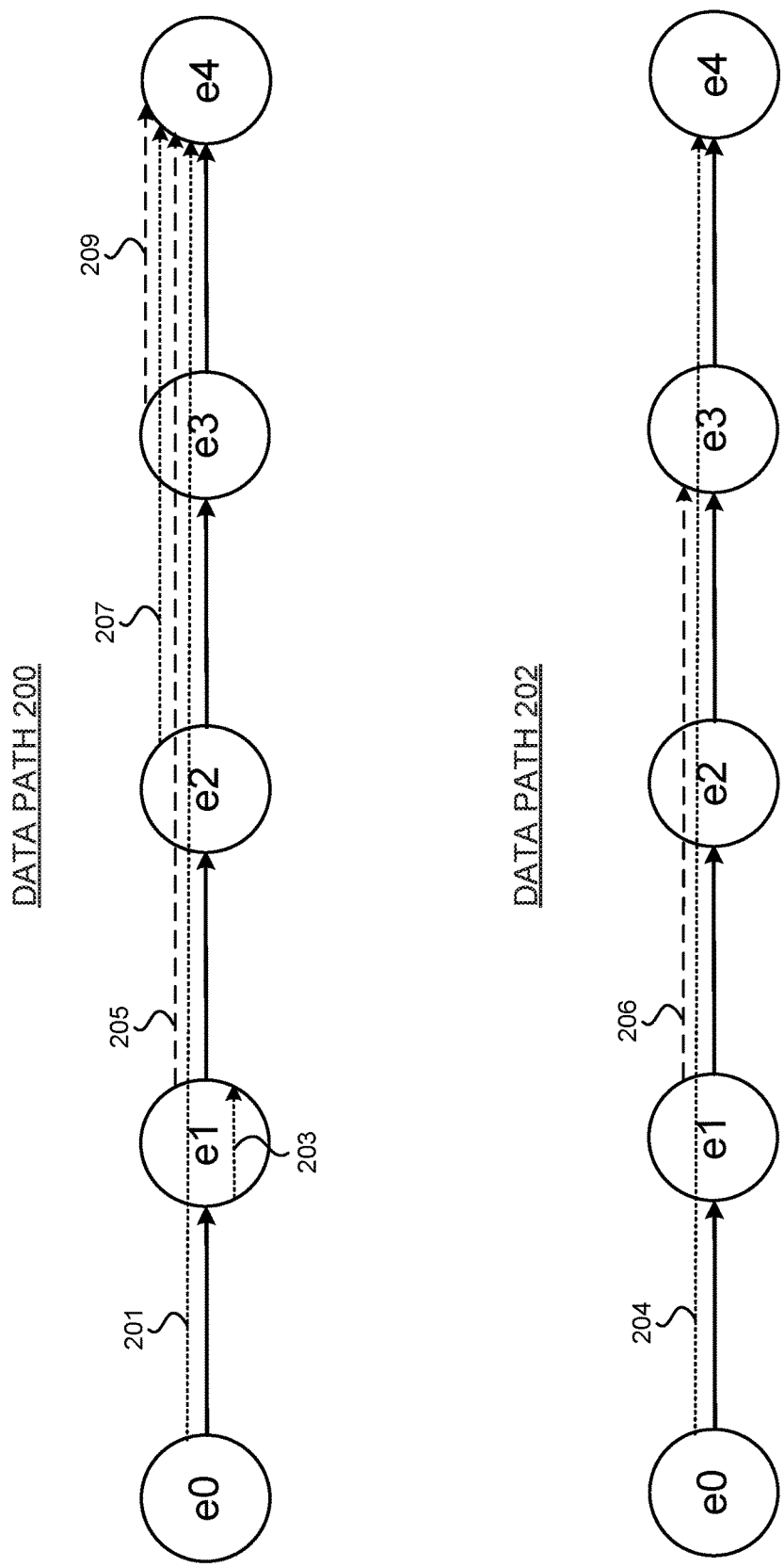
FIG. 2 depicts example data paths in an IoT system upon which the automated security design techniques described in this disclosure may be implemented.

FIG. 2 depicts example data paths in an IoT system upon which the automated security design techniques described in this disclosure may be implemented. In the illustrated embodiment, data paths 200 and 202 include a plurality of entities e0-e4 involved in sensor data transfer from sensor nodes of the IoT system to the IoT monitoring application that may be operable to process the sensor data. Data paths 200 and 202 also include a plurality of connections between the entities in the data paths as shown. In some implementations data paths 200 and 202 may include, for example, sensors (e0), smart meters (e1), an IoT gateway device (e2), an IoT platform (e3; e.g., server computer or data center), and a monitoring application (e4).

An achievable security level for the data paths 200 and 202 may not only include the two entities at the end points in the data path (e.g., sensor and monitoring application), but may also include a combination of security measures that can be deployed between the two entities. ASL can benefit from security measures implemented on previous entities or communication links in the data path. For example, if encryption of sensor data is applied on e1 and decryption is performed on e4, then any entity or communication link between e1 and e4 benefits from that encryption of the sensor data performed at e1. For example, if a firewall is placed on an IoT gateway device, the security measure can be integrated into the computation of the ASL on that entity in addition to the encryption of the sensor data performed at previous entities.

Accordingly the security level can be increased in data paths along the way to reaching the monitoring application (e4). In the depicted embodiment, data paths 200 and 202 illustrate the progress of the ASL based on applying encryption on sensor data on various entities as the sensor data propagates through the data paths. In such examples, e0 may generate sensor data which can be transmitted to entity e4 through entities e1,e2,e3. Depending on bandwidth, connectivity, availability, and secure storage capabilities, the sensor data may be persisted (e.g. stored securely) on an entity for a certain period of time (e.g. few seconds, hours, days). For example, entity e1 may be offline for few minutes and may cache any generated sensor data. Once the connectivity with entity e2 becomes available, the cached sensor data can be transmitted to e2.

Encryption may be used in data paths 200 and 202 in order to preserve the confidentiality of the sensor data. Each entity may encrypt the received data. In data path 200, for example, e0 is shown as performing encryption 201 on the sensor data with an encryption function Ek(data), and sending it to entity e1 along the communications link from e0 to e1. In this example, e1 can then subsequently perform encryption 205 on the encrypted sensor data with the encryption function E'k'(Ek(data)) and send it along the communications link to entity e2. This process can be repeated until the encrypted sensor data reaches entity e4 with e2 performing encryption 207 on the encrypted sensor data received from e1 and e3 performing encryption 209 on the encrypted sensor data received from e2. In addition, in the depicted embodiment the sensor data can be temporally stored on entity e1 in a secure data storage 203, which can be used to raise the security level of the sensor data. Then, on entity e4 the sensor data can be decrypted using the keys k''', k'', k', respectively, from the various entities e0 to e4 in the data path.

In data path 202, on the other hand, the data is only being encrypted on entities e0 (encryption 204) and e1 (encryption 206). In this case, the user has decided to strengthen the security level between e1 and e3. As a result, no encryption is performed on e2, a first decryption is performed on e3, and a second decryption is performed on e4. The maximum or minimum security level to be achieved on specific entities or communications links can be defined by end users for regulation and/or effort purposes, etc. For example, regulations may require the data controller (e.g., entity e1) to establish an encrypted channel between e1 and e3. This obligation is shown as encryption 206 in the data path 202. The data path definition, the security level, and effort can be modified by the end user after each achievable security level computation. This can ease the end-user's work while selecting the correct combination of security measures to be deployed on the data path. For example, the end user may want to strength the security on a particular sensor node, controller, or gateway in an IoT system. While defining the data path, the end user can determine the minimal security level to be achieved on the sensor or gateway, with a maximum effort.

Figure 3:
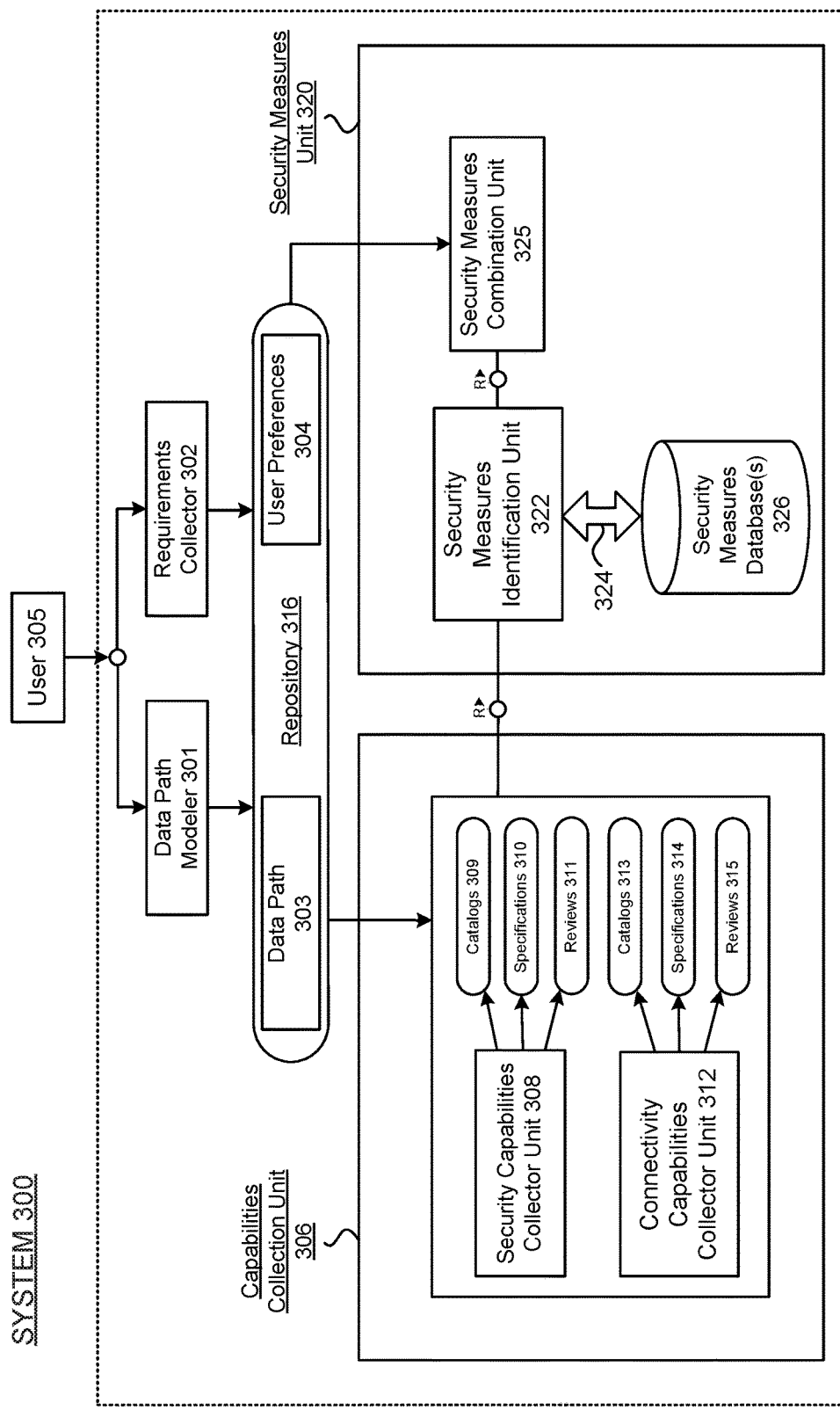
FIG. 3 depicts a conceptual block diagram of an example embodiment of a system for automated security design of IoT solutions in accordance with the techniques described in this disclosure.

FIG. 3 depicts a conceptual block diagram of an example embodiment of a system for automated security design of IoT solutions in accordance with the techniques described in this disclosure. In the illustrated embodiment, system 300 is configured to accept user input 305. The user input 305 may include one or more data path configurations for an IoT system and user preferences regarding the security features of the IoT system.

The data path modeler 301 can be configured to receive the user input 305, including the configuration of an IoT system, and to store the data path configuration 303 for the IoT system in a repository 315. The data path modeler 301 can be used for defining the data path by the end user. Likewise, the requirements collector 302 can be configured to receive user input 305, including user preferences, and to store the user preferences information 304 in repository 316. The requirements collector 302 can be configured to gather the user preferences related to the desired level of security to be achieves, threshold on effort, encryption of stored data on an entity, encryption key length, and maximum and/or minimum security level between two entities, etc.

Repository 316 may be implemented as a memory, database or other storage device within system 300 or in remote connection with system 300 over one or more networks. In one embodiment, the data path configuration information and user preferences can be input into a graphical user interface configured to receive the user input 305.

The data path information 303 stored in repository 316 can then be provided to the capabilities collection unit 306, which includes a security capabilities collection unit 308 and a connectivity capabilities collector unit 312. The capabilities collection unit 306 can be configured for identifying and collect the capabilities of each entity involved in the data path from various sources such as, but not limited to, forums, data sheets, catalogs, specifications, user guides, white papers, manufacturers' websites, reviews, etc. In the depicted embodiment, the sources include catalogs 309, specifications 310, and reviews 311. The data path information 303 can also be provided to the connectivity capabilities collector unit 312, which in certain embodiments is operable to receive information relating to the capabilities of the communication links between entities in data path 303. In the depicted embodiment, the sources include catalogs 313, specifications 314, and reviews 315. Other sources are applicable.

The capabilities of the entities and communication links within the data path 303 can then be read into the security measures identification unit 322 in the security measures unit 320. The security measures identification unit 322 can evaluate a set of available security measures that can be implemented on each of the entities in the data path 303 based on the entity capabilities received from the security capabilities collector unit 308. In one embodiment, the security measures can be queried from one or more databases. In the illustrated embodiment, the security measures are queried from security measures database(s) 326 via communication link 324. In one embodiment, the computation of security level and cost based on the security measures can be performed statically and stored as a data structure (e.g., matrix) in the security measures database(s) 326. This information can then be read into the security measures combination unit 325.

The security measures combination unit 325 can then determine the ASL and cost computed for each combination of security measures over the data path 303. In one embodiment, these computations can be done automatically. The security measures combination unit 325 can be configured to receive user preferences 304 from repository 316 as shown; and based on the user preferences, calculate the ASL and cost for each combination of security measures. The security measures combination unit 325 can also filter out combinations of security measures that do not achieve (e.g., match) the target security level or overall cost expressed in the user preferences 304. The security measures combination unit 325 can also automatically filter out any combination of security measures that does not fulfill the security requirements or available budget of the end user, or that are not in compliance with one or more regulations.

In order to support the automated selection of security measures, each combination of security measures can be ranked based on the ASL and user preferences 304 (e.g., available budget, target security level, maintenance cost, deployment cost, and/or implementation cost). As an example could be implemented with the following conditions:

```
if cost > targeted cost then rank = −1
ELSE IF achieved security level < minimum
target security level then rank = −1
ELSE rank = ASL/cost).
```

Figure 4:
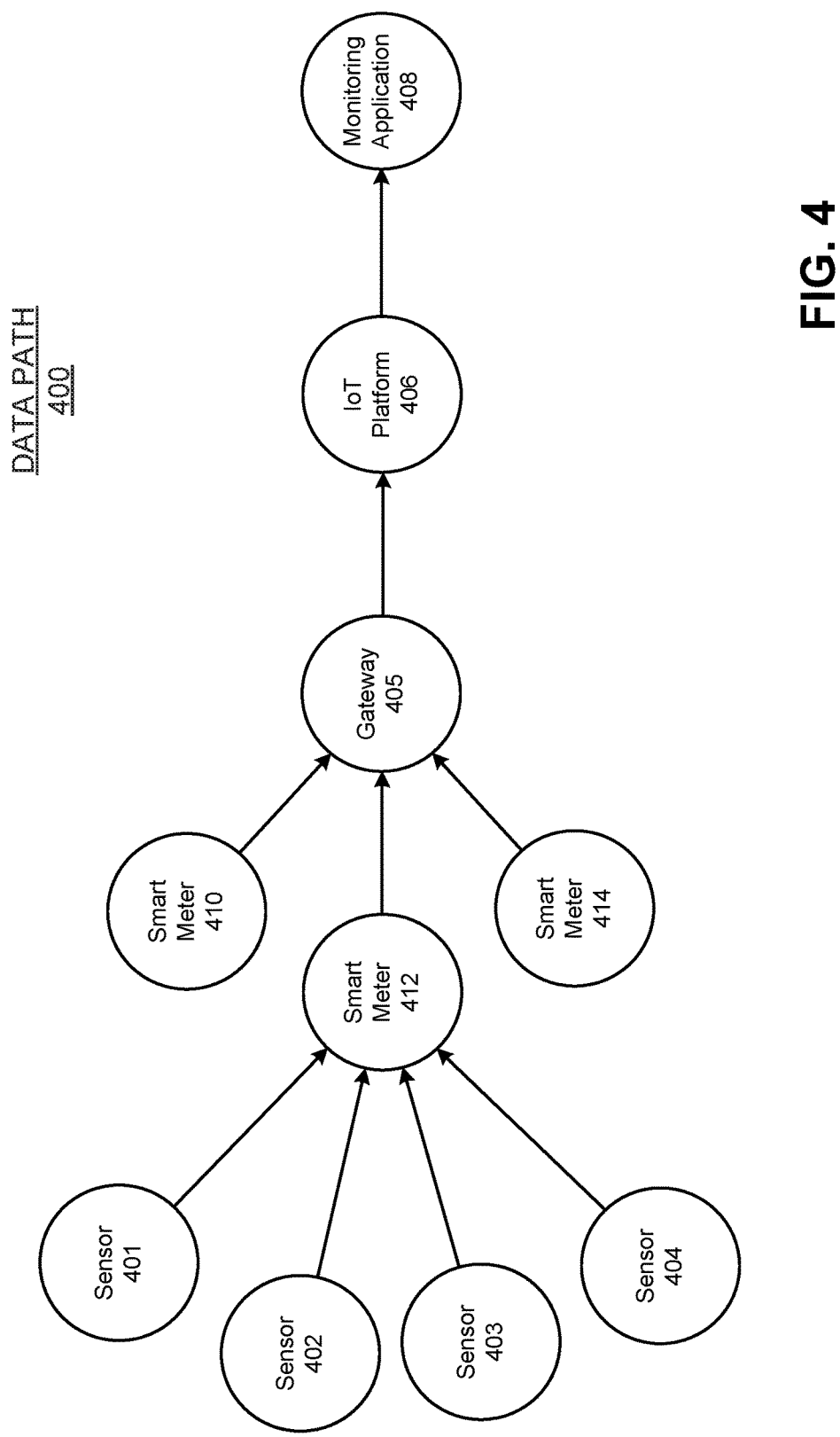
FIGS. 4-5 depict example data paths in an IoT system upon which embodiments of automated security design techniques described in this disclosure may be implemented.
Figure 5:
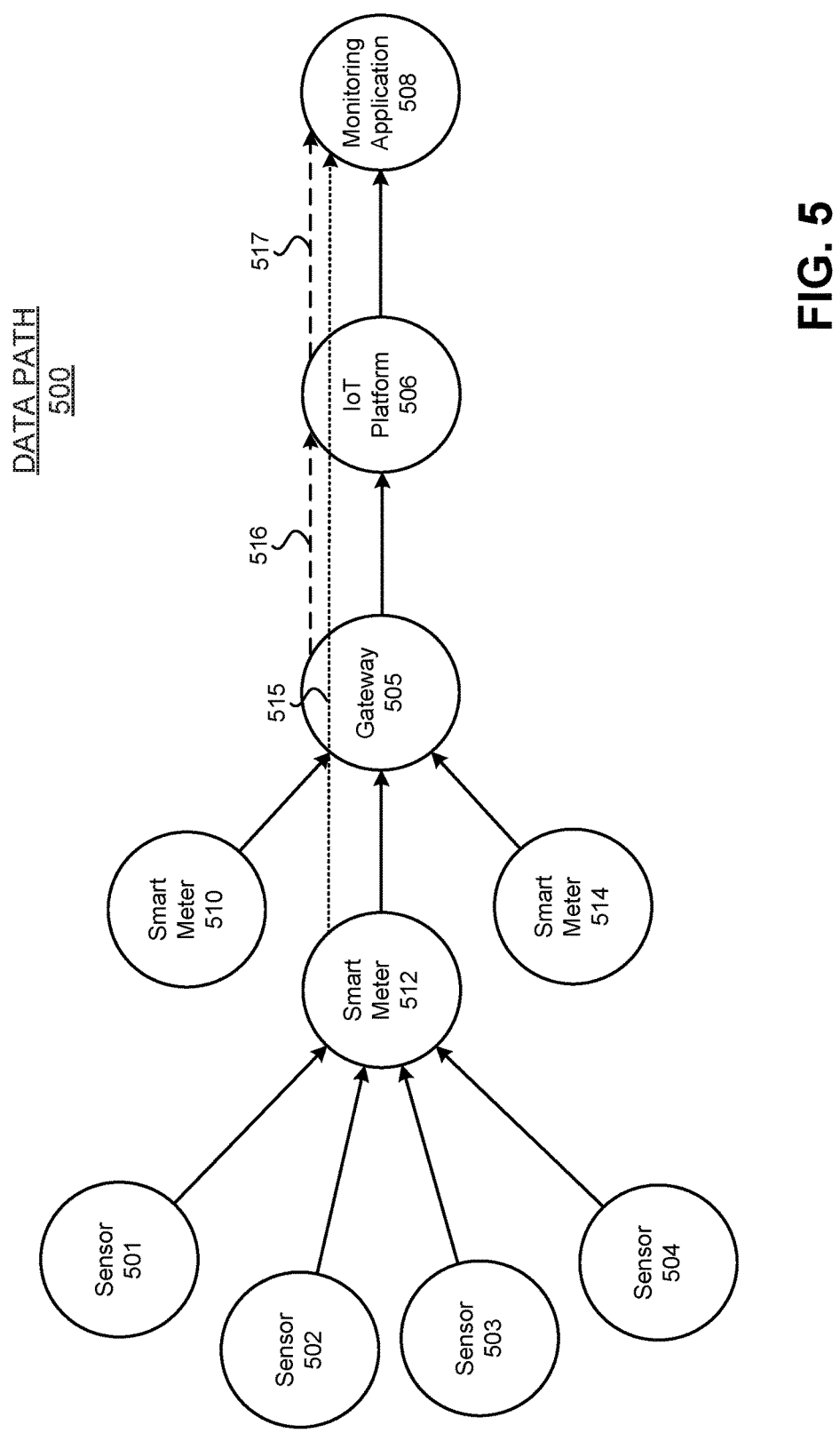

FIGS. 4-5 depict example data paths in an IoT system upon which embodiments of automated security design techniques described in this disclosure may be implemented. In the illustrated embodiment of FIG. 4, data path 400 includes a plurality of sensors 401-404 and a plurality of smart meters 410-414 configured to receive sensor data from the sensors 401-404. In the depicted embodiment, the sensor data from sensors 401-404 is communicated to the smart meter 412, and provided by the smart meter 412 to the IoT gateway device 405. The sensor data can then be provided from the IoT gateway device 405 to an IoT platform 406, which can be configured to provide the sensor data to a monitoring application 408.

In an example use case, data path 400 may represent a water distribution network monitoring system. The set of sensors 401-404 may be deployed in a city in order to monitor water pressure, debit in water pipelines, water temperature, pH levels, levels of water storage, etc. The sensors may be attached to smart metering devices 410-414, which can be configured to collect the sensor data and forward it to gateway 405. In a typical embodiment, the gateway 405 is a smarter device with increased data storage and proceeding capabilities (e.g., CPU frequency, operating system, memory, secure data storage, battery capacity, compatible communication protocols, access to cryptographic libraries, etc.).

Gateway 405 can perform further processing on the sensor data, including filtering out noise and redundant sensor data. The sensor data can then be communicated to the IoT platform 406 to perform further processing and storage of the sensor data. Finally, the monitoring application 408 can receive notifications from the IoT platform 406 regarding the water distribution network. In one embodiment, the smart metering devices 410-414 and gateway 405 can communicate through radio-based communications, while the gateway 405, IoT platform 406, and monitoring application 408 can communicate through use of an Ethernet connection.

As shown in the illustrated embodiment of FIG. 5, smart meter 512 can perform encryption 515 on the sensor data received from sensors 501-504, gateway can perform encryption 516 on the encrypted sensor data received from smart meter 512, and the IoT platform 506 can perform encryption 517 on the encrypted sensor data received from the gateway 505. This encrypted data can then be provided to the monitoring application 508 as depicted in this embodiment.

As described above with respect to FIG. 3, for each identified entity in the data path, the capability collection unit 306 can be configured to receive a list of processing capabilities. Some collected capabilities are shown in Table 1 below for an example data path. These results can then be provided to the security measures identification unit 322 and processed as discussed above.

II. Illustrative Processes

The following figures depict example flow charts illustrating various embodiments of a process for generating security policies for an IoT system in accordance with the techniques described in this disclosure. It is noted that the processes described below are exemplary in nature and are provided for illustrative purposes and not intended to limit the scope of the disclosure to any particular example embodiment. For instance, methods in accordance with some embodiments described in this disclosure may include or omit some or all of the operations described below, or may include steps in a different order than described in this disclosure. The particular methods described are not intended to be limited to any particular set of operations exclusive of all other potentially intermediate operations.

In addition, the operations may be embodied in computer-executable code, which causes a general-purpose or special-purpose computer to perform certain functional operations. In other instances, these operations may be performed by specific hardware components or hardwired circuitry, or by any combination of programmed computer components and custom hardware circuitry.

Figure 6:
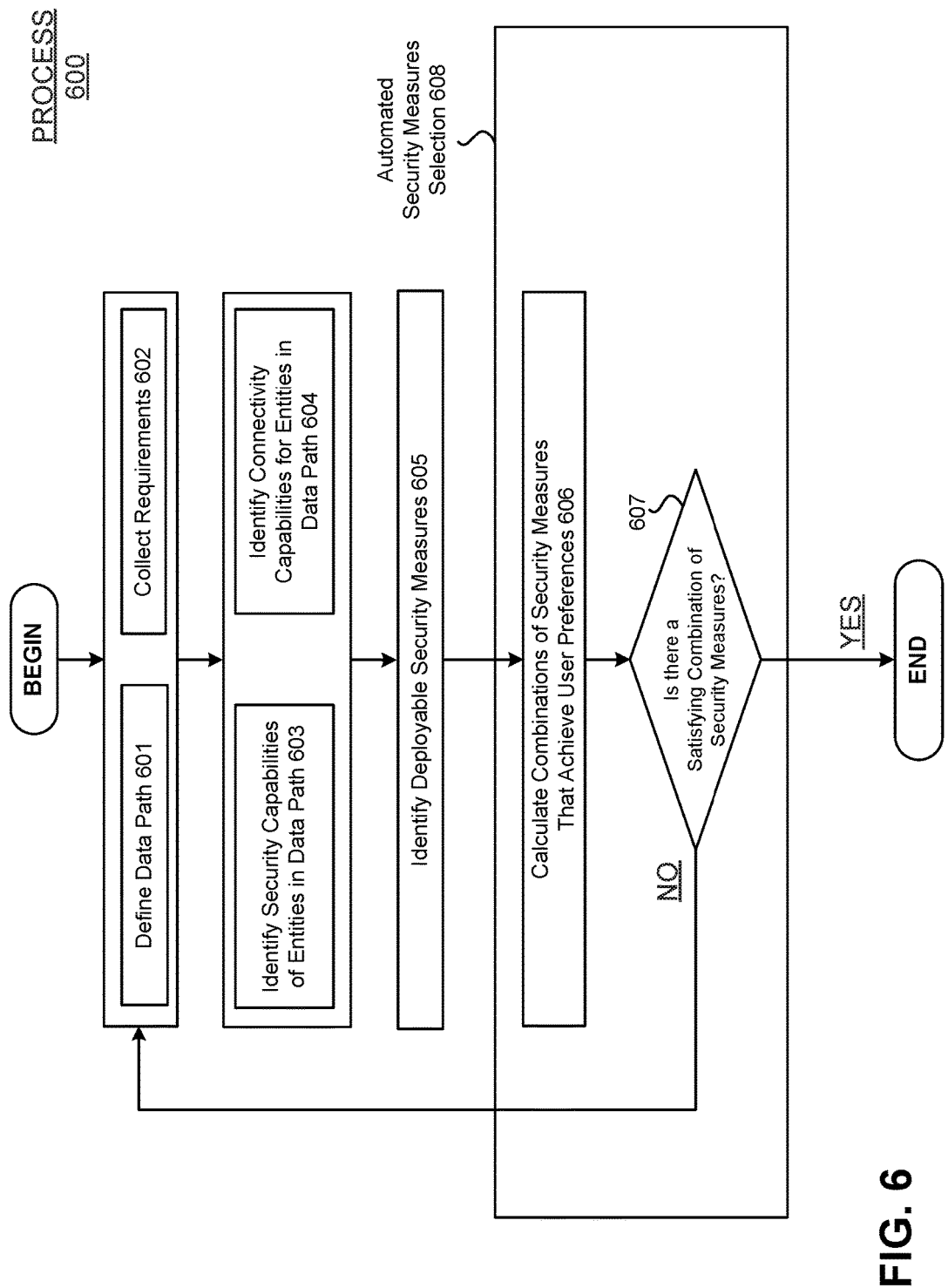
FIGS. 6-7 depict example flow charts of embodiments of a process for automating security design of an IoT system in accordance with the techniques described in this disclosure.

FIG. 6 depicts a flow chart of an example embodiment of a process for automating security design of an IoT system in accordance with the techniques described in this disclosure. In the illustrated embodiment, process 600 begins by defining a data path (operation 601) and collecting requirements, e.g., user preferences (operation 602). The security capabilities of the entities in the data path can be identified (operation 603) as well as the connectivity capabilities (operation 604). Technical characteristics (e.g. CPU frequency, RAM, ROM, secure data storage, running O/S,

TABLE 1

| Entity | Capability | |
|---|---|---|
| | Processing | Communication |
| Sensor device | none | wired to the smart meter |
| Smart meter | Microcontroller with Flash memory 256k bytes (of which 8k is used for the bootloader) SRAM 8k bytes EEPROM 4k byte Crypto library HMAC-256 | Use of Ultra Narrow Band connectivity with the gateway |
| Gateway | Micro processor, VideoCore IV GPU, 256 Megabytes of RAM Secure EEPROM | Ethernet with the IoT Plaftorm |
| IoT Platform | Processor: 1 gigahertz (GHz) or faster with support for PAE, NX, and SSE2 RAM: 1 gigabyte (GB) (32-bit) or 2 GB (64-bit) Hard disk space: 16 GB (32-bit) or 20 GB (64-bit) Graphics card: graphics device with WDDM driver Access to a Trusted Platform Module | REST API with the monitoring application |
| Monitoring application | Processor: 1 gigahertz (GHz) or faster with support for PAE, NX, and SSE2 RAM: 1 gigabyte (GB) (32-bit) or 2 GB (64-bit) Hard disk space: 16 GB (32-bit) or 20 GB (64-bit) Graphics card: sgraphics device with WDDM driver Access to a Trusted Platform Module | — | access to cryptographic libraries, etc.) of entity involved in the data path can be collected from various sources, e.g., datasheets or product specifications available on device manufacturers' web sites, catalogs, forums, etc. As an example, the processing and communication capabilities can be identified for each entity and communication link in the data path of the IoT system. Processing capabilities can determine the security measures that can be implemented on a particular device; and communication capabilities can determine the available security measures in the communication bearers or protocols.

Based on the identified capabilities, in one embodiment, the deployable security measures for each entity and connection in the data path can be identified (operation 605). Security measures include an associated effort. The effort can be monetary, human resource for maintenance, or combination of these. In addition, the ASL can be, for example, based on qualitative or quantitative risk assessment metrics. This information can then be input into the automated security measures selection part of process 600.

Based on the identified security measures, the security level and cost can be evaluated for one or more combinations of security measures (operation 606). The ASL and cost can be calculated for each combination of security measures. In addition, any combination of security measures that does not reach the desired or target security level or cost specified in the user preferences can be filtered out. Additional combinations can be filtered out based on other user preferences such as maximum/minimum security level between two entities in the data path, etc.

It can then be determined whether there is a satisfying combination of security measures that meets the user requirements (operation 607). If so, the combinations of security measures that match the desired security level and cost are output in the final result to the end user. If not, process 600 continues to operation 601 and the operations are repeated. This completes process 600 in accordance with one example embodiment. In one embodiment, this process 600 of selecting the best combinations of security measures based on user preferences can be done automatically. A feedback loop can be triggered whenever the proposed combination does not match the user preferences.

In one embodiment, the outcome of process 600 includes a combination of security measures. Security personnel or other end user can then modify any combination (e.g., remove, update, or add security measures) while the overall achieved security level is recalculated. This completes process 600 in accordance with one example embodiment.

Figure 7:
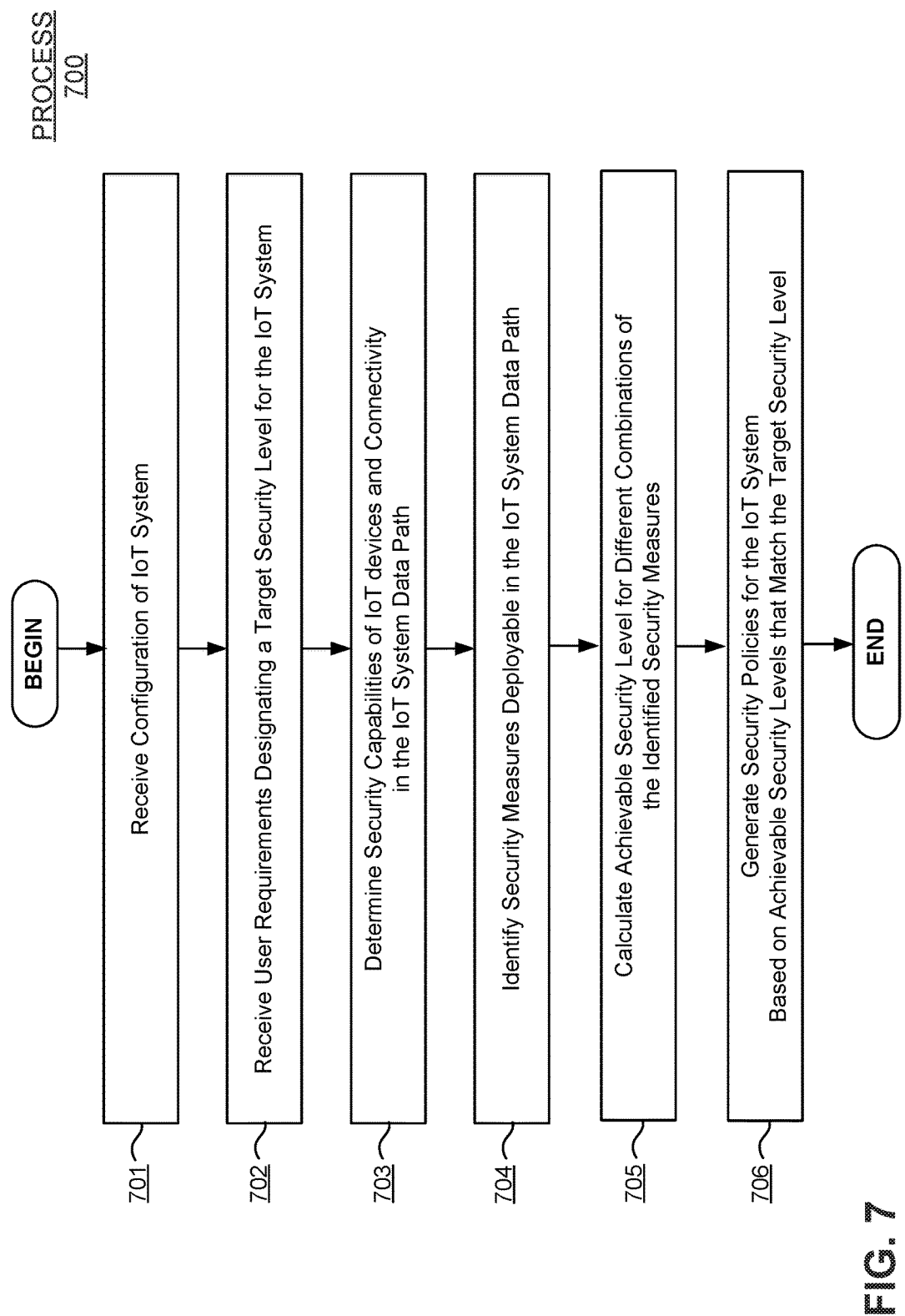

FIG. 7 depicts a flow chart of an example embodiment of a process for generating security policies for an IoT system in accordance with the techniques described in this disclosure. In one embodiment, process 700 may be implemented in a computer system for generating a set of security policies for an IoT system that includes a processor and a memory for storing computer code for execution by the processor. In the illustrated embodiment, process 700 begins at operation 701 by receiving a configuration of the IoT system. The IoT system configuration may include a data path for transferring sensor data from a plurality of sensor devices to an application for monitoring the IoT system.

Process 700 continues by receiving user requirements including a designation of a target security level for the IoT system (operation 702) and determining security capabilities of IoT devices in the data path (operation 703). In one embodiment, the IoT devices include at least one sensor device, a smart meter, and a gateway device.

Process 700 continues by identifying security measures that can be implemented on each the IoT devices based on their security capabilities (operation 704) and calculating an achievable security level for one or more combinations of security measures for the IoT devices in the data path (operation 705). A set of security policies for the IoT system can then be generated based at least in part on the achievable security levels that match the target security level (operation 706). In one embodiment, the achievable security level for each combination of security measures can be calculated based on an algorithm. In one embodiment, the algorithm may be an average or weighted average over the security measures applied on the IoT devices and communications links in the data path. This completes process 700 in accordance with one example embodiment.

The combinations of security measures can also be ranked for the IoT devices based on the achievable security level and the user requirements. In one embodiment, the data path of the IoT system can be modeled in a graphical interface of a user computing device in communication with the computer system.

In one embodiment, the security capabilities of the IoT devices may include processing capabilities for determining what security measures can be implemented on the IoT devices, and communication capabilities for determining what security measures can be implemented on the communication links between the IoT devices in the data path. The security capabilities of the IoT devices may include encryption, digital signature, and secure storage of the sensor data. Combinations of security measures can also be filtered out based on additional user requirements. Additional user requirements comprise overall cost, available budget, allocated effort, compliance with regulations, minimum and/or maximum security levels to be achieved on the IoT devices or communication links between the IoT devices in the data path, etc.

III. Illustrative Hardware Implementation

Embodiments of the present disclosure may be practiced using various computer systems including hand-held devices, microprocessor systems, programmable electronics, laptops, tablets and the like. The embodiments can also be practiced in distributed computing environments where tasks are performed by remote processing devices that are linked through one or more wire-based or wireless networks.

Figure 8:
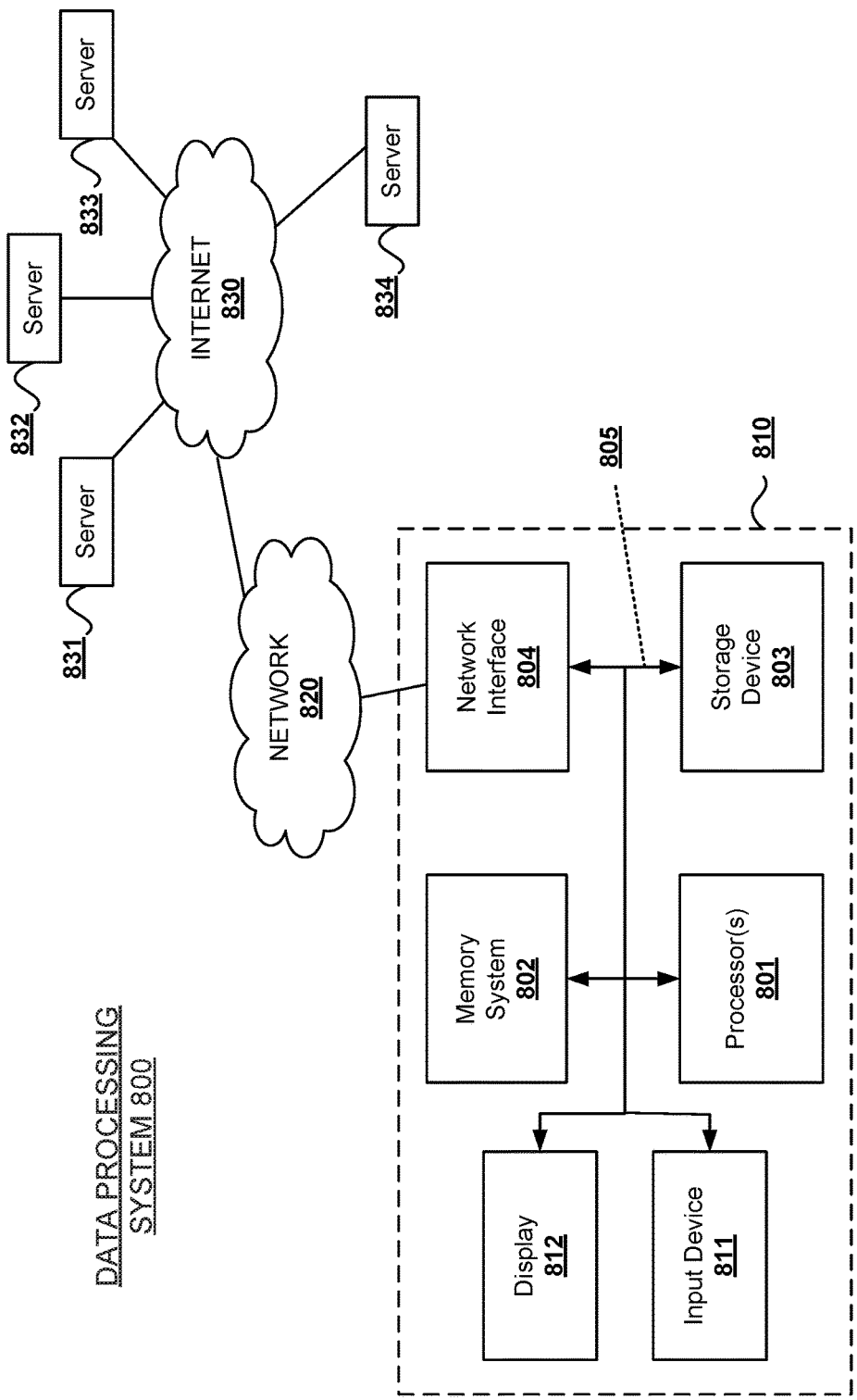
FIG. 8 depicts an example overview block diagram of a data processing system upon which the embodiments described in this disclosure may be implemented.

FIG. 8 depicts an example overview block diagram of a data processing system upon which the embodiments described in this disclosure may be implemented. It is to be understood that a variety of computers configurations may be used to implement the described techniques. While FIG. 8 illustrates various components of a data processing system 800, it is not intended to represent any particular architecture or manner of interconnecting components. It will also be appreciated that network computers and other data processing systems, which have fewer components or additional components, may be used. The data processing system 800 may, for example, comprise a personal computer (PC), workstation, laptop computer, tablet, smartphone or other hand-held wireless device, or any device having similar functionality.

In the illustrated embodiment, data processing system 800 includes a computer system 810. Computer system 810 includes an interconnect bus 805 (or other communication mechanism for communicating information) and one or more processor(s) 801 coupled with the interconnect bus 805 for processing information. Computer system 810 also includes a memory system 802 coupled with the one or more processors 801 via the interconnect bus 805. Memory system 802 is configured to store information and instructions to be executed by processor 801, including information and instructions for performing the techniques described above. This memory system may also be used for storing programs executed by processor(s) 801. Possible implementations of this memory system may be, but are not limited to, random access memory (RAM), read only memory (ROM), or combination thereof.

In the illustrated embodiment, a storage device 803 is also provided for storing information and instructions. Typically storage device 803 comprises nonvolatile memory. Common forms of storage devices include, for example, a hard drive, a magnetic disk, an optical disk, a CD-ROM, a DVD, a flash or other non-volatile memory, a USB memory card, or any other computer-readable medium from which a computer can read data and instructions. Storage device 803 may store source code, binary code, or software files for performing the techniques above. In addition, while FIG. 8 shows that storage device 803 as a local device connected with the components of the data processing system, it will be appreciated by skilled artisans that the described techniques may use a storage device remote from the system, such as a database or other network storage device coupled with the computer system 810 through a network interface such as network interface 804.

Network interface 804 may provide communications between computer system 810 and a network 820. The network interface 804 may be a wireless or wired connection, or any combination thereof. Computer system 810 is configured to send and receive information through the network interface 804 across one or more networks 820 such as a local area network (LAN), wide-area network (WAN), wireless or Bluetooth network, or the Internet 830, etc. Computer system 810 may access data and features on systems residing on one or multiple different hardware servers 831-834 across the network 820. Hardware servers 831-834 and associated server software may also reside in a cloud computing environment.

Storage device and memory system are both examples of non-transitory computer readable storage media. Embodiments in this disclosure can be embodied in computer-readable code stored on any computer-readable medium, which when executed by a computer or other data processing system, can be adapted to cause the system to perform operations according to the techniques described in this disclosure. Computer-readable media may include any mechanism that stores information in a form accessible by a data processing system such as a computer, network device, tablet, smartphone, or any device having similar functionality. Examples of computer-readable media include any type of non-transitory, tangible media capable of storing information thereon, including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing data and instructions in an electronic format. Computer-readable media can also be distributed over a network-coupled computer system stored and executed in a distributed fashion.

Further, computer system 810 may be coupled via interconnect bus 805 to a display 812 for displaying information to a computer user. An input device 811 such as a keyboard, touchscreen, and/or mouse is coupled to bus 805 for communicating information and command selections from the user to processor 801. The combination of these components allows the user to communicate with the system. In some systems, bus 805 represents multiple specialized interconnect buses.

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a computer system. The techniques may be carried out in a computer system or other data processing system in response executing sequences of instructions stored in memory.

Throughout the foregoing description, for the purposes of explanation, numerous specific details were set forth in order to provide a thorough understanding of the disclosure. It will be apparent, however, to persons skilled in the art that these embodiments may be practiced without some of these specific details. The above examples and embodiments should not be deemed to be the only embodiments, and are presented to illustrate the flexibility and advantages of the techniques described in this disclosure. Other arrangements, embodiments, implementations and equivalents will be evident to those skilled in the art and may be employed without departing from the spirit and scope of the disclosure as defined by the following claims.

What is claimed is:

1. A method comprising:
in a computer system for generating a set of security policies for an Internet of Things ("IoT") system, the computer system comprising at least one processor and a memory for storing computer code for execution by the processor:
receiving a configuration of the IoT system comprising a data path for transferring sensor data from a plurality of sensor devices to an application for monitoring the IoT system;
receiving user requirements comprising a designation of a target security level for the IoT system;
determining security capabilities of IoT devices in the data path, wherein the IoT devices include at least one sensor device, a smart meter, and a gateway device;
identifying security measures that can be implemented on each the IoT devices based on their security capabilities;
calculating an achievable security level for one or more combinations of security measures for the IoT devices in the data path; and
generating the set of security policies for the IoT system based on the achievable security levels that match the target security level.

2. The method of claim 1 wherein the achievable security level for each combination of security measures is calculated based on an algorithm.

3. The method of claim 2 wherein the algorithm is an average or weighted average over the security measures applied on the IoT devices and communications links in the data path.

4. The method of claim 1 further comprising ranking the combinations of security measures for the IoT devices based on the achievable security level and the user requirements.

5. The method of claim 1 wherein the data path of the IoT system is modeled in a graphical interface of a user computing device in communication with the computer system.

6. The method of claim 1 wherein the security capabilities of the IoT devices include:

processing capabilities for determining what security measures can be implemented on the IoT devices, and communication capabilities for determining what security measures can be implemented on the communication links between the IoT devices in the data path.

7. The method of claim 1 wherein the security capabilities of the IoT devices include encryption, digital signature, and secure storage of the sensor data.

8. The method of claim 1 further comprising filtering out combinations of security measures based on additional user requirements.

9. The method of claim 1 wherein additional user requirements comprise overall cost, available budget, allocated effort, and compliance with regulations.

10. The method of claim 1 wherein additional user requirements comprise minimum or maximum security levels to be achieved on one or more of the IoT devices or communication links between the IoT devices in the data path.

11. The method of claim 1 further comprising ranking the combinations of security measures for the IoT devices based on the achievable security level and the user requirements.

12. A system comprising:
at least one processor; and
a memory in communication with the processor, the memory configured to store computer code, which when executed by the processor, causes the processor to perform operations for generating a set of security policies for an Internet of Things ("IoT") system, the operations comprising:
receiving a configuration of the IoT system comprising a data path for transferring sensor data from a plurality of sensor devices to an application for monitoring the IoT system;
receiving user requirements comprising a designation of a target security level for the IoT system;
determining security capabilities of IoT devices in the data path, wherein the IoT devices include at least one sensor device, a smart meter, and a gateway device;
identifying security measures that can be implemented on each the IoT devices based on their security capabilities;
calculating an achievable security level for one or more combinations of security measures for the IoT devices in the data path; and
generating the set of security policies for the IoT system based on the achievable security levels that match the target security level.

13. The system of claim 12 wherein the achievable security level for each combination of security measures is calculated based on an algorithm.

14. The system of claim 13 wherein the algorithm is an average or weighted average over the security measures applied on the IoT devices and communications links in the data path.

15. The system of claim 12 wherein the operations further comprise ranking the combinations of security measures for the IoT devices based on the achievable security level and the user requirements.

16. The system of claim 12 wherein the data path of the IoT system is modeled in a graphical interface of a user computing device in communication with the system.

17. The system of claim 12 wherein the security capabilities of the IoT devices include:
processing capabilities for determining what security measures can be implemented on the IoT devices, and
communication capabilities for determining what security measures can be implemented on the communication links between the IoT devices in the data path.

18. The system of claim 12 further comprising filtering out combinations of security measures based on additional user requirements.

19. A non-transitory computer readable storage medium storing programmed computer code, which when executed by a computer system, causes the computer system to perform operations for generating a set of security policies for an Internet of Things ("IoT") system, the operations comprising:
receiving a configuration of the IoT system comprising a data path for transferring sensor data from a plurality of sensor devices to an application for monitoring the IoT system;
receiving user requirements comprising a designation of a target security level for the IoT system;
determining security capabilities of IoT devices in the data path, wherein the IoT devices include at least one sensor device, a smart meter, and a gateway device;
identifying security measures that can be implemented on each the IoT devices based on their security capabilities;
calculating an achievable security level for one or more combinations of security measures for the IoT devices in the data path; and
generating the set of security policies for the IoT system based on the achievable security levels that match the target security level.

20. The computer readable storage medium of claim 19 wherein the achievable security level for each combination of security measures is calculated based on an average or weighted average over the security measures applied on the IoT devices and communications links in the data path.

* * * * *